(No Model.)

D. P. ALLEN.
HYDRAULIC VALVE FOR ELEVATORS.

No. 423,105. Patented Mar. 11, 1890.

Witnesses
Chas. F. Schmelz,
E. F. Seymour

Inventor
Dwight P. Allen,
By his Attorney
John C. Dewey

UNITED STATES PATENT OFFICE.

DWIGHT P. ALLEN, OF WORCESTER, MASSACHUSETTS, ASSIGNOR TO THE WORCESTER ELEVATOR COMPANY, OF SAME PLACE.

HYDRAULIC VALVE FOR ELEVATORS.

SPECIFICATION forming part of Letters Patent No. 423,105, dated March 11, 1890.

Application filed October 26, 1889. Serial No. 328,336. (No model.)

*To all whom it may concern:*

Be it known that I, DWIGHT P. ALLEN, a citizen of the United States, residing at Worcester, in the county of Worcester and State of Massachusetts, have invented certain new and useful Improvements in Hydraulic Valves for Elevators and other Apparatus; and I do hereby declare that the following is a full, clear, and exact description thereof, which, in connection with the drawings making a part of this specification, will enable others skilled in the art to which my invention belongs to make and use the same.

My invention relates to tubular piston-valves designed for general use as a three or more way valve, and more particularly to a tubular valve for controlling the supply of water to and from a hydraulic elevator-cylinder.

The object of my invention is to simplify and cheapen the construction of valves of the class referred to; and my invention consists in certain novel features of construction of a tubular piston-valve, as will be hereinafter fully described.

In my improved construction the valve is made in sections in order to facilitate the construction and to easily adjust the valve in position at any desired angle convenient for attaching the pipes through which the water passes.

Figure 1:
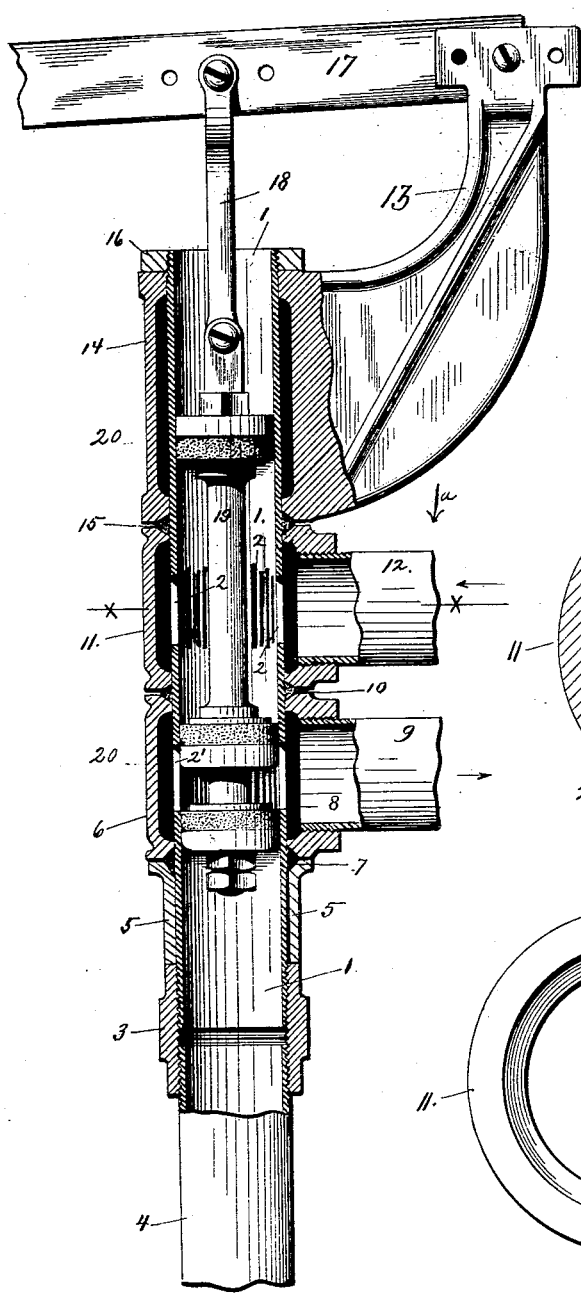
Figure 2:
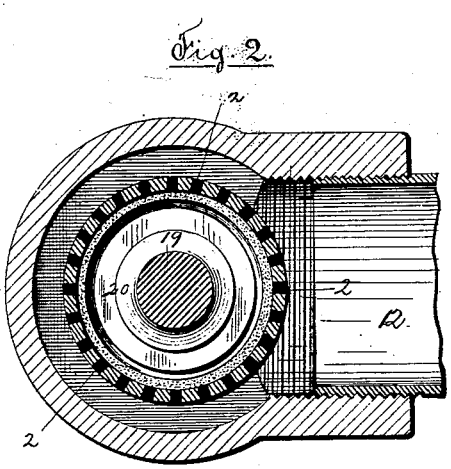
Figure 3:
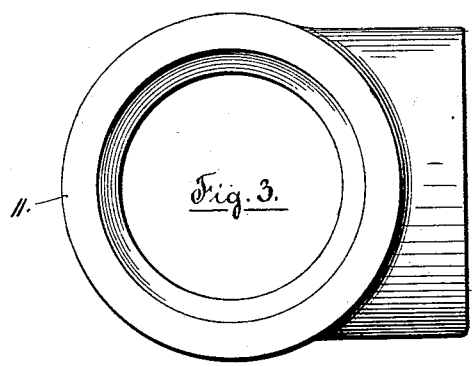

Referring to the drawings, Figure 1 represents a central vertical section of a three-way valve of my improved construction and the connecting-pipes for the passage of water. Fig. 2 represents, on an enlarged scale, a cross-section on line *x x*, Fig. 1, looking in the direction of arrow *a*, same figure; and Fig. 3 is a plane view, on an enlarged scale, of one of the saddles removed.

In the accompanying drawings, 1 is the center tube or cylinder, made in one piece and provided with a screw-thread on its exterior surface at each end. The center tube 1 is provided with two sets of openings or slots 2 and 2' cut in it, preferably of different lengths, for the passage of water into and out of the tube 1. Upon the lower end of the center tube 1 is secured a hub 3, in this instance screwed onto the lower end of said tube, an interior screw-thread on said hub 3 engaging with the exterior screw-thread on the end of the tube 1. An exhaust-pipe 4 is screwed into the lower end of the hub 3. A thimble or collar 5 encircles the tube 1 and rests on the hub 3, the upper end of which forms a shoulder or bearing for said collar 5.

The pipe-connection or saddle 6 encircles the tube 1 at a point where the lower set of openings 2' are cut in said tube and bears at its lower end on the upper end of the collar 5. A water-tight joint is made between the collar 5 and saddle 6 by means of solder or packing 7, extending in corresponding beveled grooves in the upper end of said collar and the lower end of the saddle 6.

The saddle or pipe-connection 6 is cored out upon its interior surface, forming a chamber 8, extending around the tube 1, inclosing the openings 2' in said tube. One side of the saddle 6 is provided with a hole or opening, preferably screw-threaded in its interior, into which is screwed in this instance the outlet-pipe 9. The upper end of the saddle 6 is preferably provided with a beveled groove extending around the tube 1 to receive a packing 10, preferably of india-rubber, inserted between the upper end of the saddle 6 and the lower end of the saddle 11, provided with a corresponding beveled groove, in order to make a water-tight joint.

The construction of the saddle or pipe-connection 11 is similar to that of the saddle 6, and said saddle 11 rests upon the top end of the saddle 6 and loosely encircles the tube 1 at the point where the upper set of openings 2 are cut in said tube, forming a chamber around said openings. The inlet-pipe 12 is in this instance screwed into the saddle or pipe-connection 11.

The lever-supporting arm 13 has a hub 14 at its lower end, which loosely encircles the tube 1 at its upper end and rests upon the top of the saddle 11. The lower end of said hub 14 and the upper end of the saddle 11 are provided with beveled grooves extending around the tube 1, in which is inserted a packing 15, preferably of india-rubber, to make a water-tight joint.

A nut 16 is screwed onto the top of the tube 1 and can be screwed down to compress the packings and force the saddles and hubs together and hold them firm and secure them in place on the tube 1 after they have been adjusted thereon.

In the upper end of the arm or bracket 13 is pivoted one end of the lever 17, which is connected by a link 18 with the upper end of the piston-stem 19 of the piston 20, of ordinary construction and adapted to move up and down within the tube 1 to control the flow of water into and out of said tube by opening and closing the passages 2 and 2' for the water.

The collar 5 may be dispensed with and the nut 16 screwed down on the top of the tube 1 to bind the hub 14, saddle 11, and saddle 6 together and against the hub 3, fast on the lower end of the tube 1; or in place of the hub 3 a nut may be employed.

In lieu of the nut 16 on the upper end of the tube 1 for securing the several parts in place on the tube 1 after they have been mounted thereon and adjusted in position, any equivalent means may be employed—for instance, bolts extending on the outside of the several sections of the valve from the top to the bottom of the tube 1 and secured to collars or shoulders on the top and bottom ends of said tube.

The advantages of my improved construction of valves will be apparent to those skilled in the art. I produce a valve made up of several parts, which are mounted on a central tube or cylinder and may be adjusted thereon relatively to each other and then secured in place. In this way I do away with all extra and special fittings for connecting the inlet and outlet pipes with the pipes through which the water passes to the cylinder, and I can fit the valve in any position by simply adjusting the inlet and outlet pipe-connections on the central tube or cylinder, so as to carry the water straight to the valve, which avoids friction and hammer of the water in the pipes.

I am aware that prior to my invention hydraulic valves for elevators have been made with a central tube or cylinder having openings or water-passages therein and having the inlet and outlet pipes made in one piece mounted thereon, as shown in Patent No. 248,908, of November 1, 1881.

Having thus described my invention, what I claim as new, and desire to secure by Letters Patent, is—

1. In a valve, the combination, with the center tube or cylinder provided with openings or slots therein for the passage of water, of the inlet and outlet pipe-connections mounted on said tube and one of said connections adjustable thereon relatively to the other, for the purpose stated, substantially as set forth.

2. In a valve, the combination, with the center tube or cylinder having water-passages therein for the passage of water, of the inlet and outlet pipe-connections made independently thereof and mounted on said tube and adjustable thereon relatively to each other, for the purpose stated, and means for securing the same in position, substantially as set forth.

3. In a valve, the combination, with a center tube, a collar on the lower end thereof, and a nut on the upper end thereof, said tube provided with openings for the passage of water, of a hub carrying the piston-lever-supporting arm, an inlet pipe-connection, and an outlet pipe-connection made independently of said tube and mounted thereon between said collar and nut so as to be adjustable relatively to each other and secured in place, substantially as set forth.

4. In a valve, the combination, with the center tube or cylinder having water-passages therein, consisting of slots or openings of different length, of the inlet and outlet pipe-connection mounted on said tube and adjustable thereon relatively to each other, for the purpose stated, substantially as set forth.

DWIGHT P. ALLEN.

Witnesses:
GEORGE T. DEWEY,
JOHN C. DEWEY.